(12) United States Patent
Hanchett

(10) Patent No.: US 9,395,205 B1
(45) Date of Patent: Jul. 19, 2016

(54) METHOD OF CALIBRATING LASER MEASUREMENT SYSTEMS IN-SITU

(76) Inventor: Michael T. Hanchett, Lynnwood, WA (US)

(*) Notice: Subject to any disclaimer, the term of this patent is extended or adjusted under 35 U.S.C. 154(b) by 928 days.

(21) Appl. No.: 13/475,130

(22) Filed: May 18, 2012

(51) Int. Cl.
*G01C 25/00* (2006.01)

(52) U.S. Cl.
CPC .................................. *G01C 25/00* (2013.01)

(58) Field of Classification Search
CPC .................................. G01C 3/00; G01C 25/00
USPC ................. 702/85, 116, 159, 94; 342/165
See application file for complete search history.

(56) References Cited

U.S. PATENT DOCUMENTS

| | | | | |
|---|---|---|---|---|
| 5,757,500 A | * | 5/1998 | Rueb | 356/620 |
| 6,028,936 A | * | 2/2000 | Hillis | 713/168 |
| 6,399,937 B1 | * | 6/2002 | Huang et al. | 250/216 |
| 6,480,271 B1 | * | 11/2002 | Cloud et al. | 356/152.1 |
| 7,181,856 B1 | * | 2/2007 | Hanchett et al. | 33/288 |
| 8,209,134 B2 | * | 6/2012 | Parker et al. | 702/34 |
| 2004/0109394 A1 | * | 6/2004 | Huang | 369/30.16 |
| 2005/0232466 A1 | * | 10/2005 | Kampchen et al. | 382/103 |
| 2006/0180581 A1 | * | 8/2006 | Swaringen et al. | 219/121.83 |
| 2011/0235052 A1 | * | 9/2011 | Schmitz et al. | 356/608 |

* cited by examiner

*Primary Examiner* — Sujoy Kundu
*Assistant Examiner* — Catherine Rastovski
(74) *Attorney, Agent, or Firm* — Michael J. Tavella

(57) ABSTRACT

A process for calibrating and correcting errors in laser measurement systems in situ, either remotely over the Internet or where the laser measurement system is physically located. In one embodiment, a number of targets are arrayed around the scanner and read by the software of a system. The laser scanner is rotated 180 degrees and the positions of the targets are read again. A correction factor is determined by calculation and displayed to show the expected improvement in accuracy of the laser measurement system. In a second embodiment, the laser scanner is positioned under a vehicle with targets at reference positions for which the measurements are known. The scanner readings are checked against the known values and a correction factor developed. This could be applied on a one-time basis or it can be programmed in the host computer where evaluation and compensation occur automatically.

25 Claims, 24 Drawing Sheets

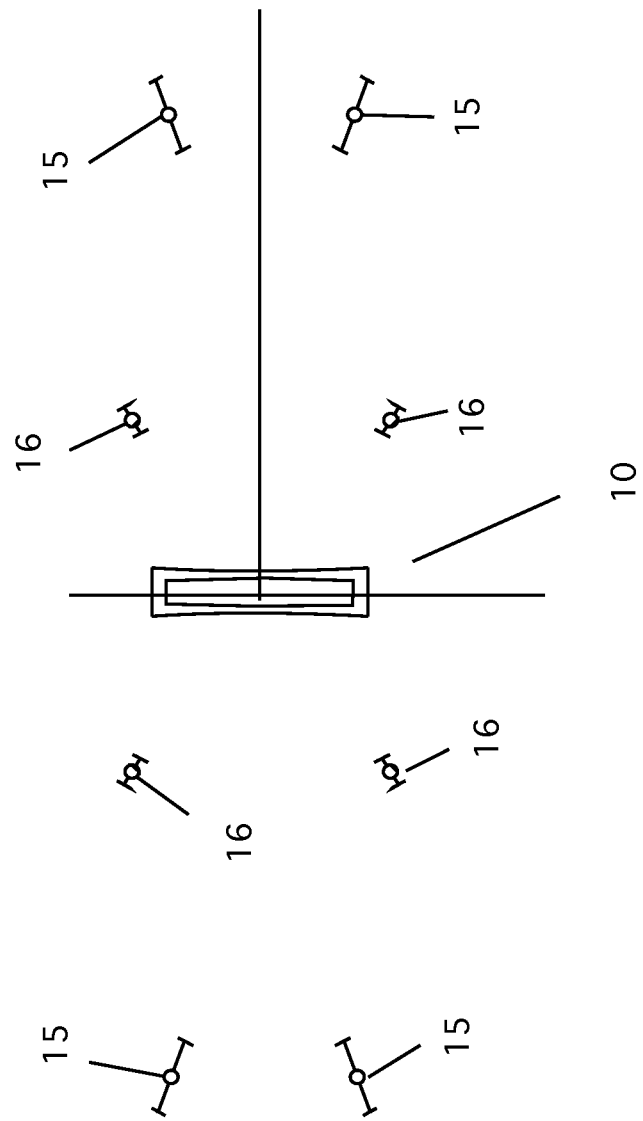

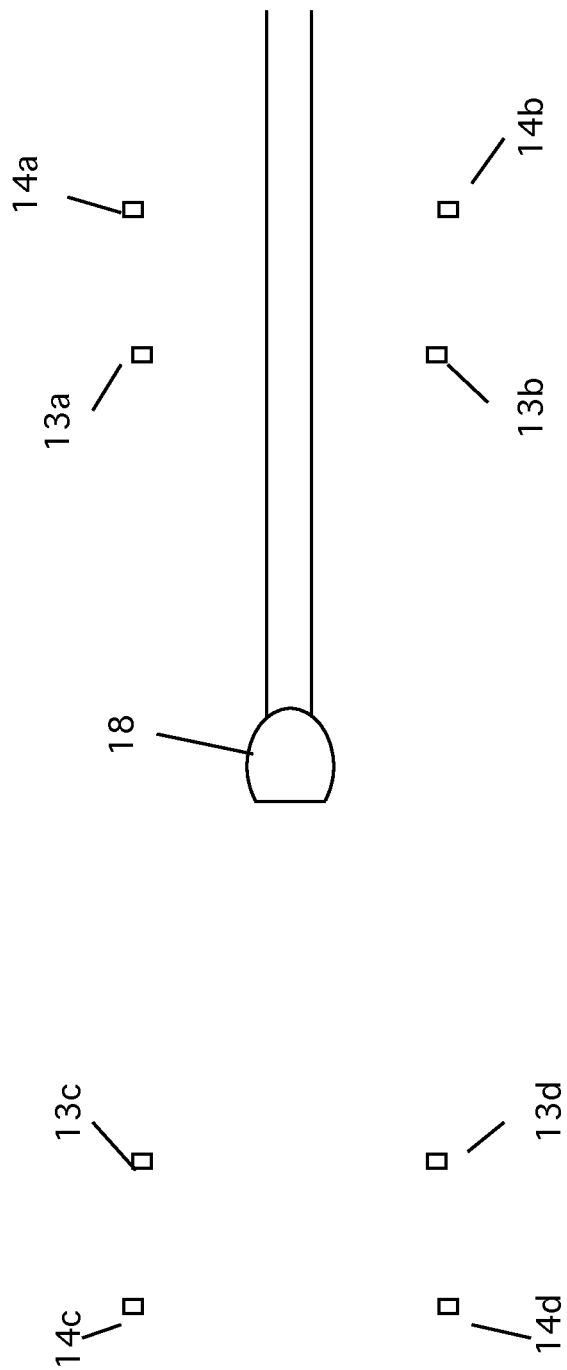

METHOD OF CALIBRATING LASER MEASUREMENT SYSTEMS IN-SITU

CROSS REFERENCE TO RELATED APPLICATIONS

Not Applicable

STATEMENT REGARDING FEDERALLY SPONSORED RESEARCH AND DEVELOPMENT

Not Applicable

BACKGROUND OF THE INVENTION

1. Field of the Invention

This invention relates to methods of recalibrating laser measurement systems and particularly to methods of recalibrating laser measurement systems in situ.

2. Description of the Prior Art

Laser measurement systems or other light-based systems, which employ triangulation or polar coordinates to determine the position of retro-reflective targets position at specific known reference points, such as on the frame of a vehicle, have been used for years. Examples of such a system can be found in U.S. Pat. No. 5,801,832 and its related patents and published applications. In such a system, a beam of the laser scanner is split into two beams by a 50/50 beam splitter, each beam then directed to a rotating mirror. The rotating mirrors direct the laser beams in a 360-degree arc or circle, with both beams being directed in a single plane. The distance between the two laser beams forms the base of the triangle and the two angles generated by the rotating mirrors provide the position of the target. The system requires each of the rotating mirrors to be "synched" to the mechanical centerline of the laser of the laser scanner. The synch position is typically calibrated at the factory using a table with a precision grid of targets. There are several factors in addition to synch that are taken into account during this calibration. When the unit is put into the field and measurements taken in situ, it is common for this synch reference to move which causes measurement errors.

Once errors are detected, the only present way to recalibrate the scanner is to send it back to the factory for recalibration. Such a procedure can be time consuming, costly and unproductive as the unit must be sent out meaning work using that scanner must either be put on hold or the facility must have several scanners ready for use when one more scanners is/are sent back for recalibration.

BRIEF DESCRIPTION OF THE INVENTION

The instant invention overcomes this problem. The invention is a method that allows scanner factors affecting the measurement accuracy, such as, synch errors, to be corrected while the laser measurement system is in situ, either remotely, for example, over the Internet or at the place of business where the laser measurement system is physically located.

In one embodiment of the method, a number of targets are arrayed around the scanner. There is no requirement for specific positioning of the targets or the laser scanner of the laser measurement system. This embodiment of the invention can be performed, for example, under a car or vehicle that is being repaired or on the shop floor. The target positions are read by the software of a particular laser measurement system in accordance with its normal operating procedures. Then, the laser scanner is rotated 180 degrees and the positions of the targets are read a second time. Calculations are performed and a synch correction factor is determined and displayed to show to the user of the laser measurement system the expected improvement in accuracy of the laser measurement system prior to loading the new synch correction factor. The original synch value in the host computer of the laser measurement system can be overwritten (and the original, or default value stored) or a correction factor can be applied in the host computer.

In a second embodiment of the method of the present invention, the laser scanner is positioned under a vehicle with targets at reference positions for which the measurements are known. The scanner readings are checked against the known values and a correction factor developed to zero out the synch error. This could be applied on a one-time basis or it can be programmed in the host computer as an automated process of the host computer software where evaluation and compensation occur automatically.

In a third embodiment, the scanner position with respect to targets is ignored. A minimum of two targets is scanned and the distances between all targets calculated. The scanner is then moved forward or backwards or side-to-side and the targets are again scanned

BRIEF DESCRIPTION OF THE DRAWINGS

FIG. 3*b* a diagrammatic view of a scanner that is out of calibration showing the measured location and the correct position of the targets.

FIG. 5 is a diagrammatic view of a laser scanner with first position targets shown as used in a second embodiment.

DETAILED DESCRIPTION OF THE INVENTION

For a Velocity (triangulation based laser) scanners there are two primary methods of determining error/correction of the baseline synch. The first method compares the locations of targets against a known set of measurement reference points. This is done by comparing the locations of the targets from one position of the scanner to second position of the scanner. The second position can be accomplished by rotating the scanner 180 degrees, by moving the scanner forwards or backwards, or by moving the scanner from side to side.

Rotating the scanner 180 degrees provides the greatest difference from which to calculate the error for correction and is the preferred method for the triangulation based systems.

In addition to the least squares method of calculating the errors, several other mathematical systems can be used to arrive at a converging solution to correct the synch offset. For example, an iterative approach, which takes more than one position movement to determine the error, can be used successfully. However, the least squares fit is the preferred method.

Figure 1:
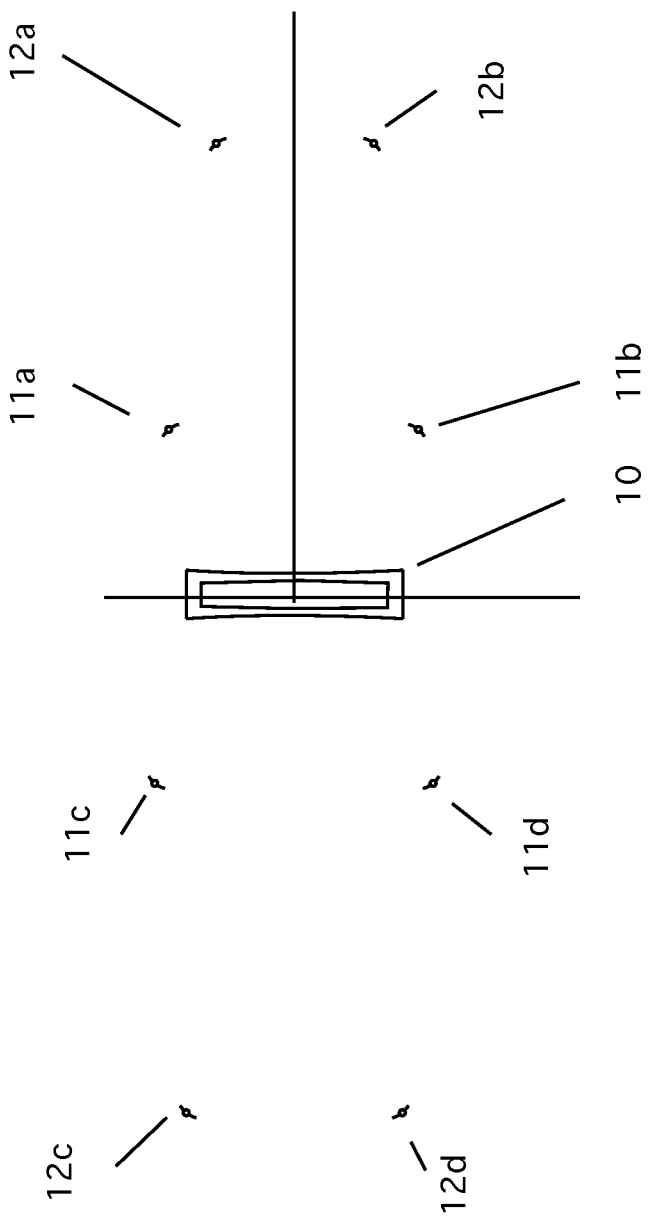
FIG. 1 is a diagrammatic view of a scanner that is set up with a field of eight targets, four in the near field and four in the far field.
Figure 1A:
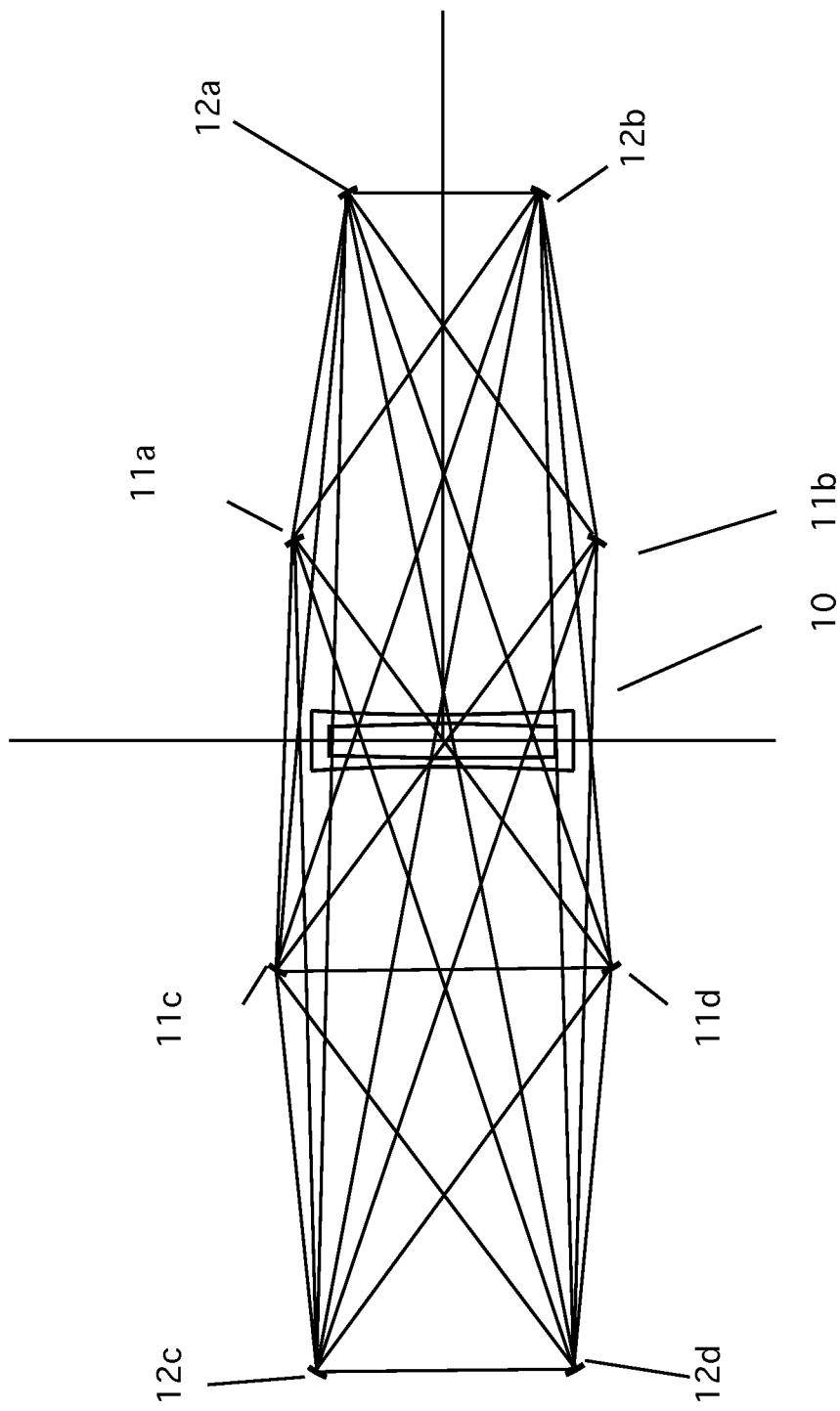
FIG. 1*a* is a diagrammatic view of a scanner in the forward direction reading targets.
Figure 1B:
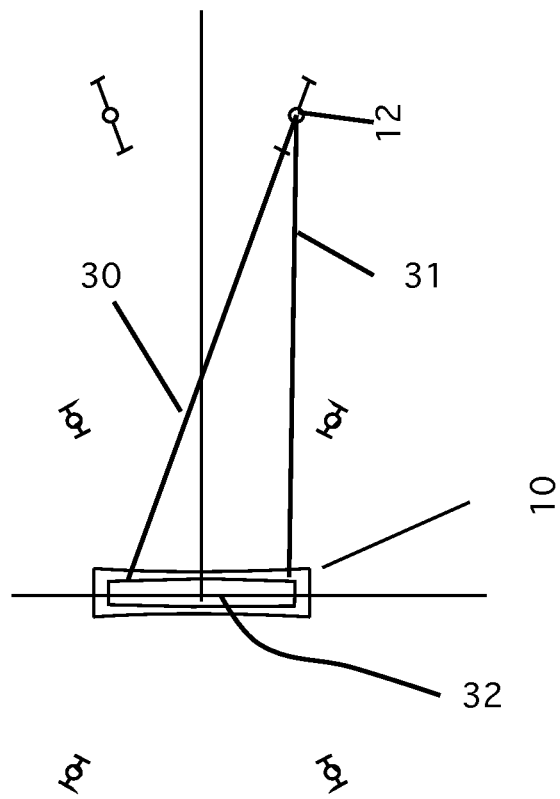
FIG. 1*b* is a diagrammatic view of a scanner locating a target by triangulation.

As noted above, laser measurement systems are known that use triangulation to determine the location of targets in length and width as disclosed by U.S. Pat. No. 5,801,834. The distance between dual laser beams projected by the laser scanner of the system forms the base of the triangle and each of the projected lasers creates the remaining two sides of the triangle. The angle of each leg is calculated by calculating the angle based on the timing from the baseline start (synch) to the target face, as for example, disclosed by U.S. Pat. No. 5,801,834. FIG. 1b shows a scanner 10 locating a target with triangulation. In this case, the target 12 is "seen" by a pulse 30 from one mirror and by pulse 31 from the second mirror. Each rotating mirror of the laser scanner is independent in its rotation. When the scanner is calibrated at the factory, the synch pulse is calculated so that it matches the centerline (base line) of the scanner, i.e., half the distance between the projected laser beams. This creates the baseline measurement 32 of the triangle that allows the angle of each rotating mirror to triangulate on the targets to determine their position in space. FIG. 1b shows a calibrated scanner indicating the correct target.

When the scanner is out of calibration, the synch pulses are no longer coordinated and the base line of the scanner is no longer a true base. To correct this, two methods are offered that allow the scanner to be recalibrated in situ.

In method 1, there is no preliminary information regarding target placement. Targets are read and then the scanner is rotated 180 degrees and the targets are read again to provide a second set of data to allow the best fit analysis to converge on the common answer between the first measurement and the second.

For the first method, the scanner is set up with targets placed on either side of the scanner. Note, although a minimum of two targets in the field of view on either side of the scanner can be used, for purposes of this illustration, eight targets are used. As shown in FIG. 1, the scanner 10 is set up with a field of eight targets, four in the near field 11a-11d (approx 2-3 feet) and four in the far field 12a-12d (approx 8 feet). The scanner is queried for measurements and the target locations (in scanner coordinates) are saved. This is shown in FIG. 1a with each of the lines representing a measured distance to the targets by the scanner.

Figure 2:
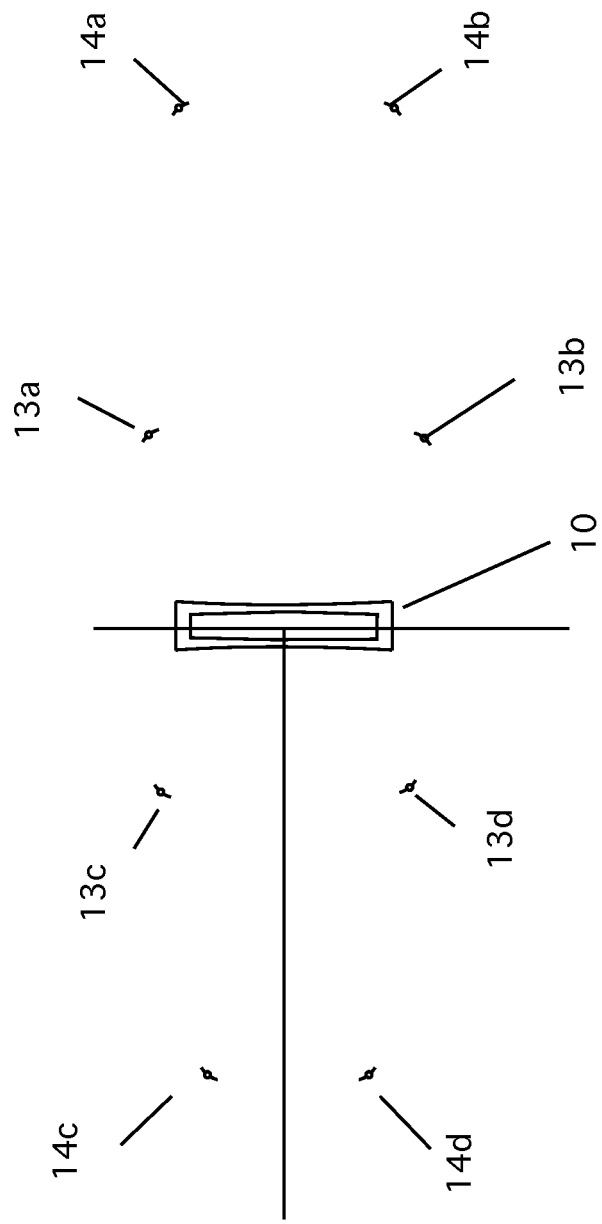
FIG. 2 is a diagrammatic view of a scanner that is set up with a field of eight targets, four in the near field and four in the far field and the scanner being rotated 180 degrees from the position in FIG. 1.
Figure 2A:
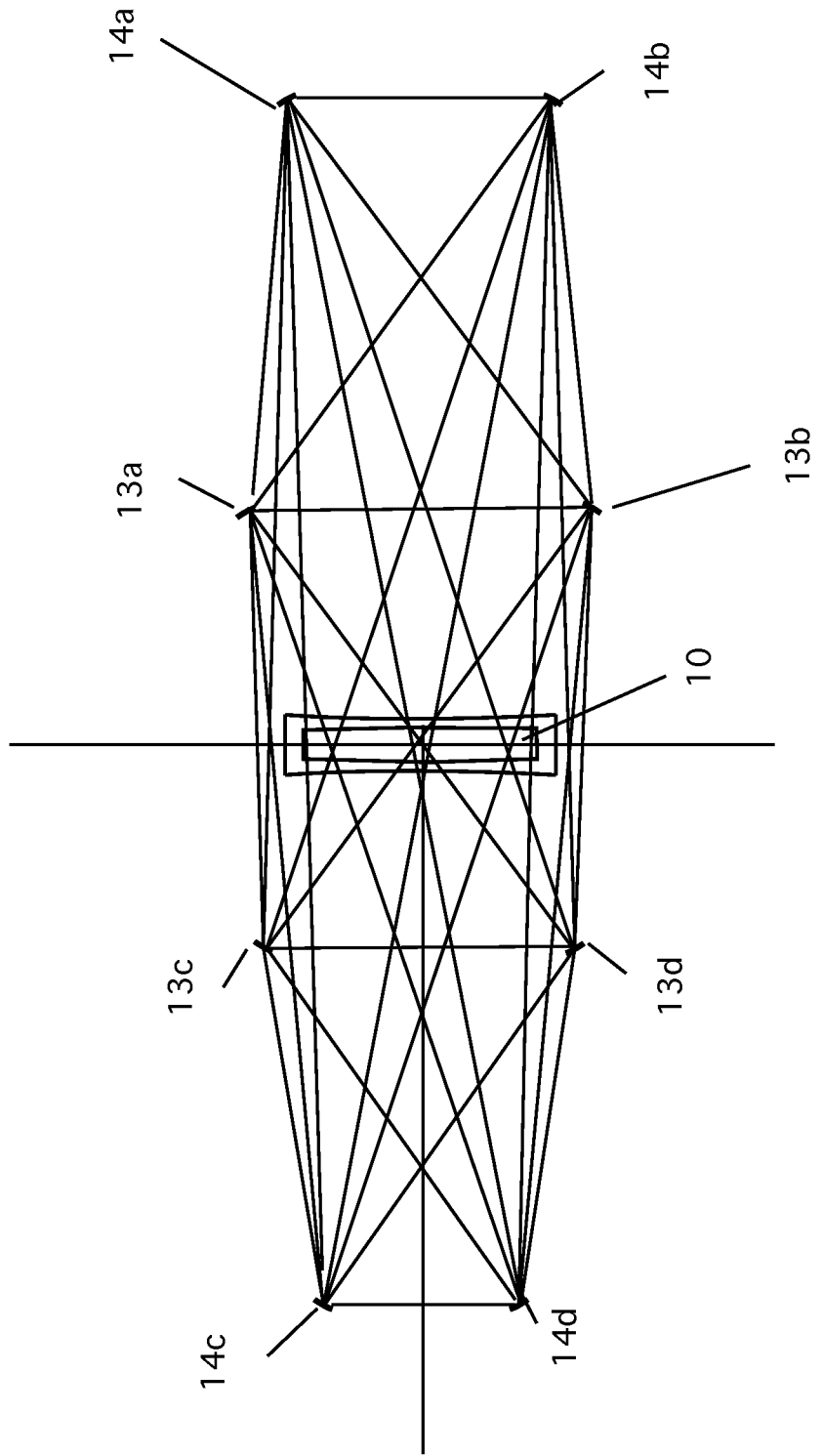
FIG. 2*a* a diagrammatic view of a scanner rotated 180 degrees reading targets.

The scanner is rotated about a plane, 180 degrees (+/−10°) as shown in FIG. 2 below. This rotation will not be perfect, so the scanner transformation will need to be corrected using the near targets. Again, measurements are taken and the target locations saved. FIG. 2 shows the target locations as measured by the scanner 10. The locations are 13a-13d in the near field and 14a-14d for the far field. Again, measurements are taken and the target locations save, as shown in FIG. 2a.

Figure 3:
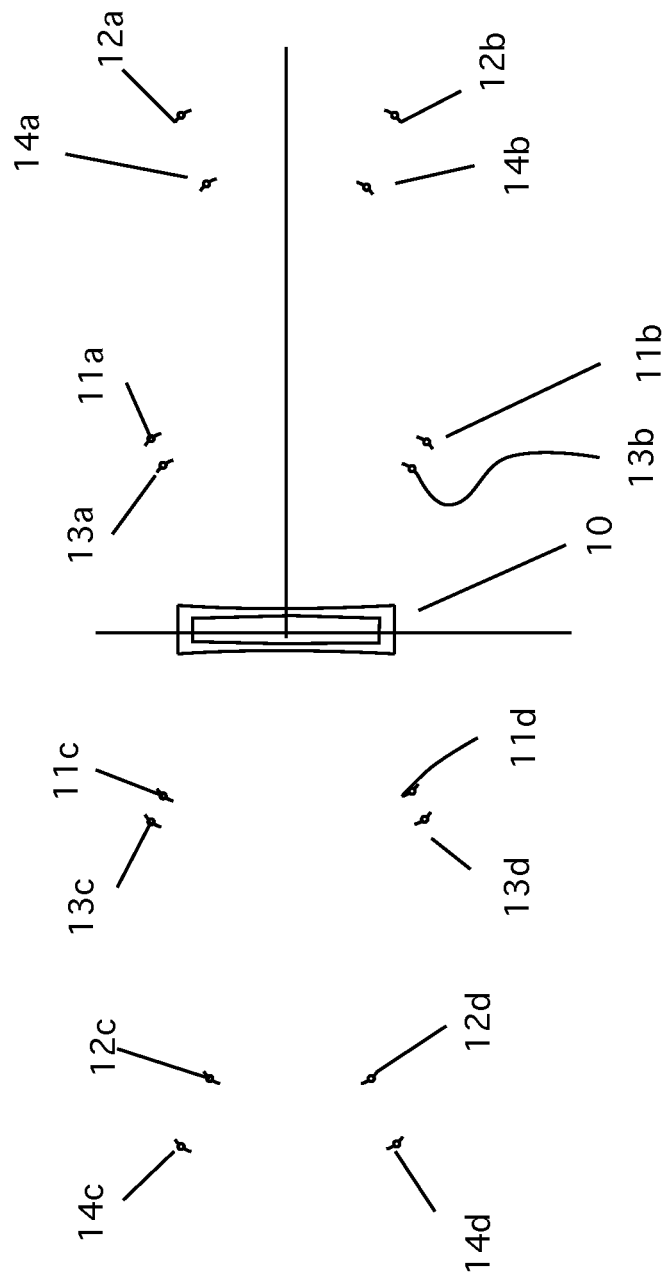
FIG. 3 is a diagrammatic view of a scanner that is out of calibration, showing the two fields of targets do not match in a long in front, short in back" error.
Figure 3A:
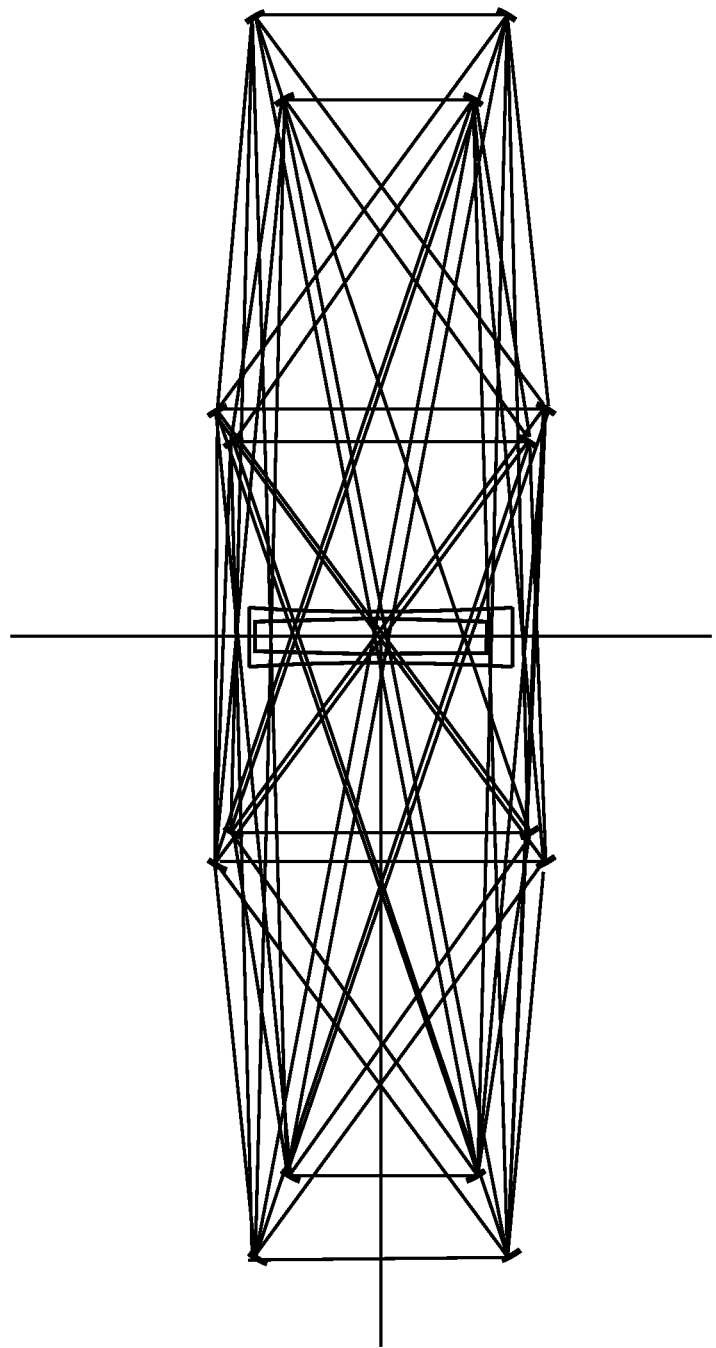
FIG. 3*a* is a diagrammatic view of scanner reading showing the calibration error in the scanner.

If the scanner is out of calibration, the two fields of targets will not match as illustrated below in FIG. 3, which illustrates the classic "long in front, short in back" error. This is illustrated in FIG. 3a, which shows the differences in measurements.

As noted above, when one or both rotating mirrors have a synch pulse that is different than the original calibration, it causes an error in the position of the targets. As illustrated in FIG. 3b, the correct position for the targets is represented by the center spheres in each of the target locations 15 for the far targets and 16 for the near targets.

Figure 4:
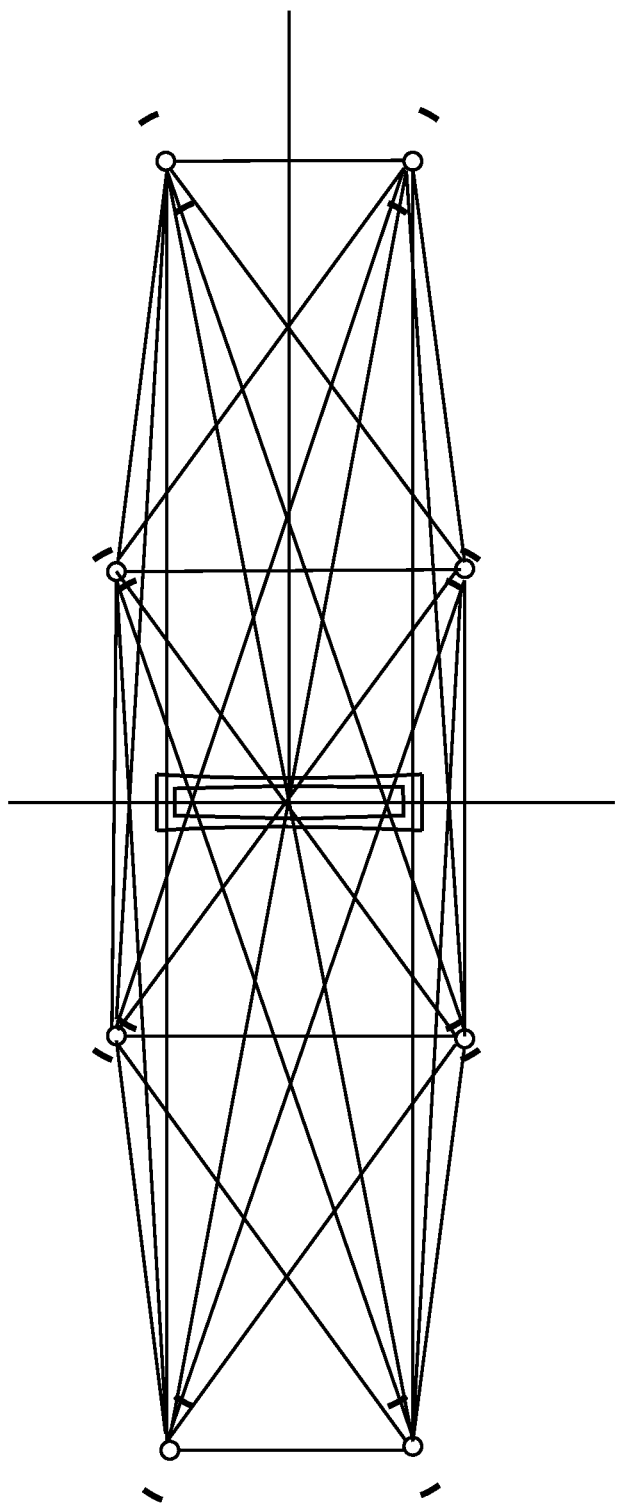
FIG. 4 a diagrammatic view of a scanner and targets with the least squares fit being applied to minimize the triangulation error of the scanner
Figure 4A:
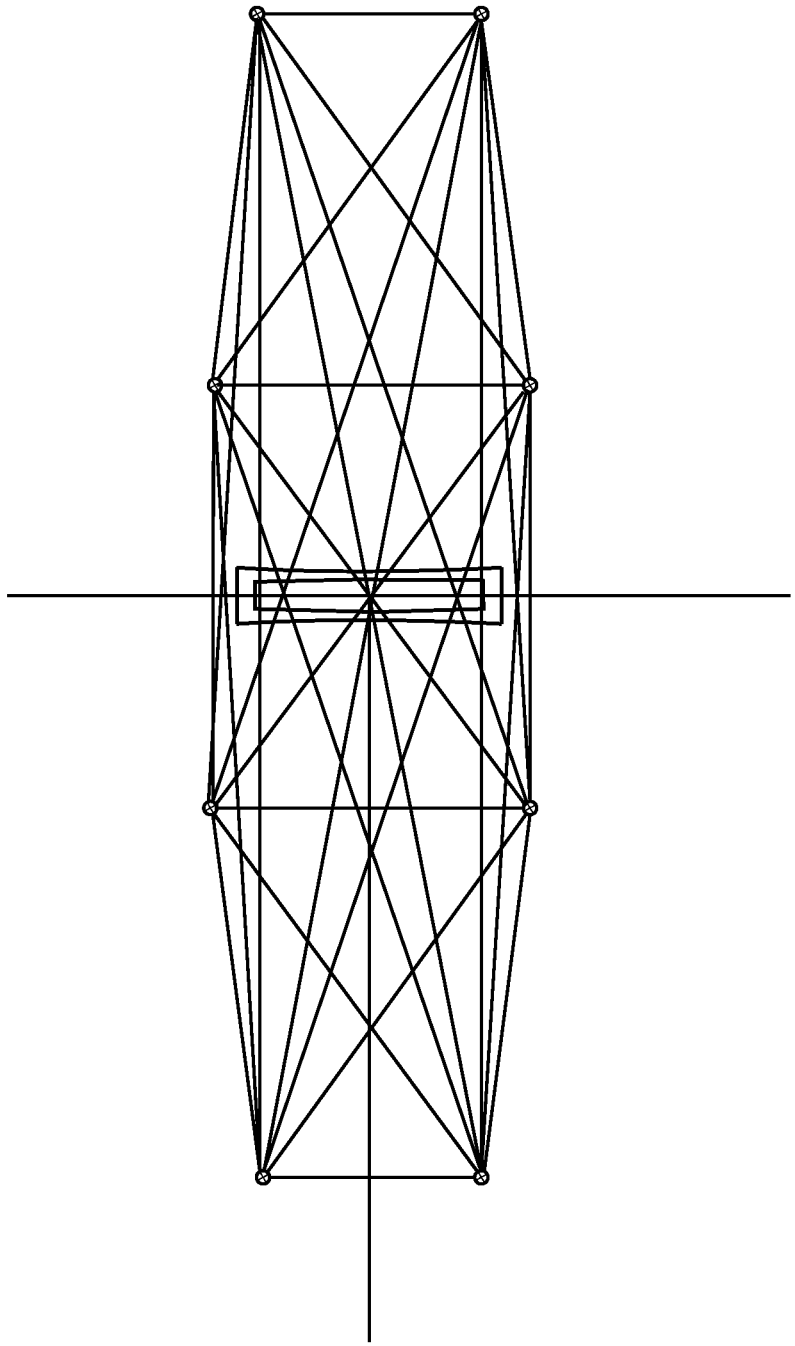
FIG. 4*a* is a diagrammatic view of a calibrated scanner that shows the scanner indicating the correct position of a target.

In accordance with the present invention, using a least squares fit and interpolating and correcting the synch pulse corrects the triangulation error. This is illustrated in FIG. 4, which shows the correct location and the erroneous locations mapped out. When correctly calibrated, the scanner should return the same target positions no matter in which position the scanner is rotated, as shown in FIG. 4a.

Essentially, in the first embodiment of the invention the position of the scanner must be calculated to transform the locations of the targets.

Since the correction software is using the four near field targets to transform the rotated laser to the coordinate system, it may be necessary to iterate the corrections, which may be accomplished by returning the scanner to its original position and utilizing the corrected values to improve the readings.

In the second embodiment of the method of the present invention, the laser scanner is positioned under a vehicle with targets at reference positions that the measurements are known. The scanner readings are checked against the known values and a correction factor developed to zero out the synch error or, in the case of polar lasers, discussed below, to correct the beam parallelness. This could be applied on a one-time basis or it can be programmed in the host computer as an automated process of the host computer software where evaluation and compensation would occur automatically. In this version, the scanner position is effectively ignored and the difference in measured distances between the targets is processed with the least squares fit.

For a polar coordinate based laser, such as an ECLIPSE type, in which two laser beams are used, there are two primary methods of determining error/correction in the two beams. Since it is a single rotating hub and the rotation component is transformed, the synch starting point is removed. The critical element that needs to be corrected on this scanner is the angle between the two beams. The method of correction is as follows:

First, compare the locations of targets against a known measurement reference points. Second, compare the locations of the targets from one position of the scanner to second position of the scanner. Note, in this technique rotating the scanner does not accomplish anything, so the scanner is moved forward or from side to side. Once the readings are obtained, several math approaches can be used to arrive at a converging solution to correct the parallelness of the laser beams. The preferred embodiment uses a least squares fit. However, other methods could be used as well. This method is illustrated in FIGS. 5-10.

FIG. 5 is a diagrammatic view of a laser scanner with first position targets shown as used in a second embodiment. Here, the scanner 18 is shown positioned among eight targets, as before. These targets are 13a-13d in the near field and 14a-14d for the far field. Note, a minimum of two targets in the field of view on either side of the scanner can be used.

Figure 5A:
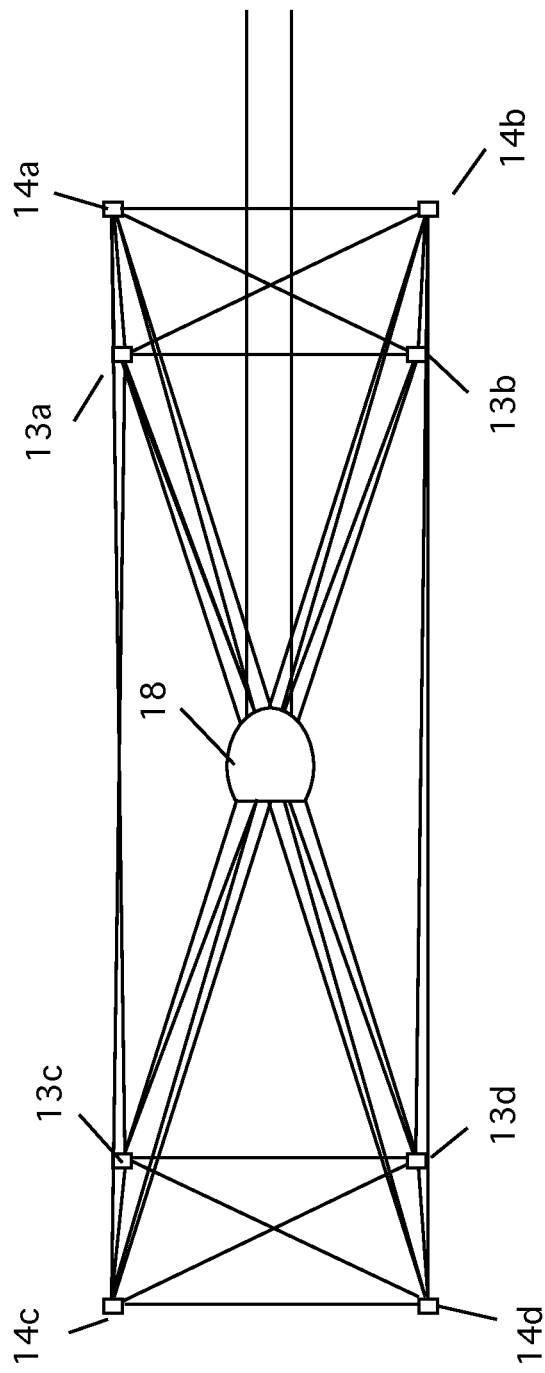
FIG. 5*a* is a diagrammatic view of showing the computed distances between the targets for the first scanner position as used in a second embodiment.

FIG. 5a is a diagrammatic view of showing the computed distances between the targets for the first scanner position as used in a second embodiment. These distances are represented by the lines running to and between the targets.

Figure 6:
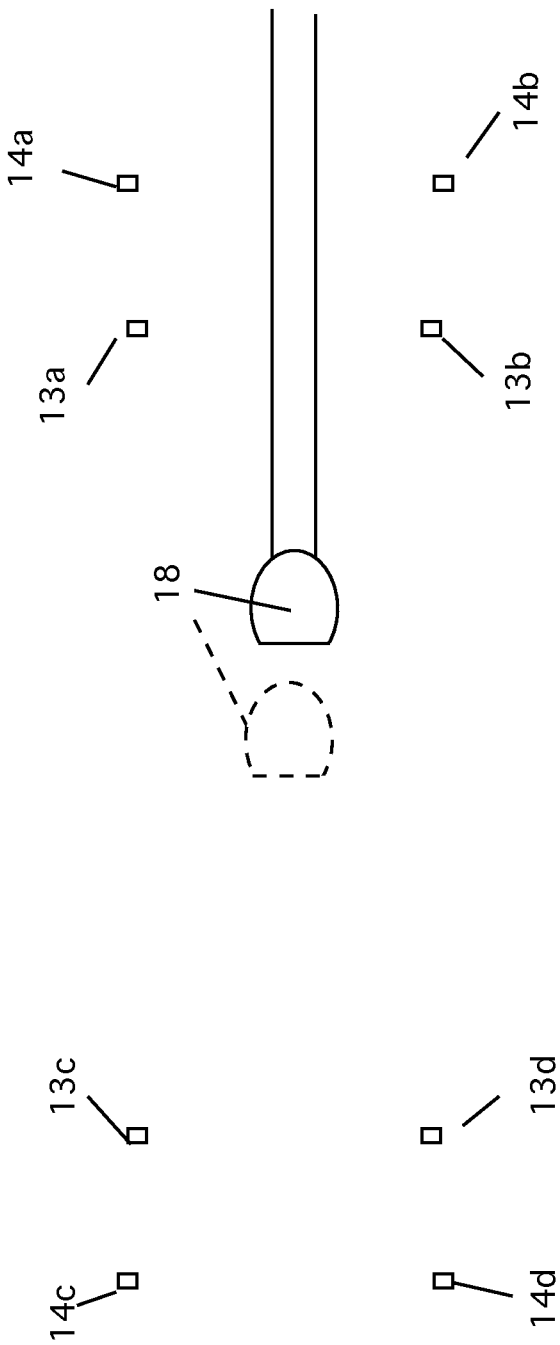
FIG. 6 is a diagrammatic view of a laser scanner showing the scanner moved to a second position as used in a second embodiment.

FIG. 6 is a diagrammatic view of a laser scanner showing the scanner 18 moved to a second position as used in a second embodiment. Here, the scanner is simply moved forward. Of course, it can be moved backward, or side-to-side as well. The important thing is that the scanner obtains readings from a different position with respect to the targets.

Figure 6A:
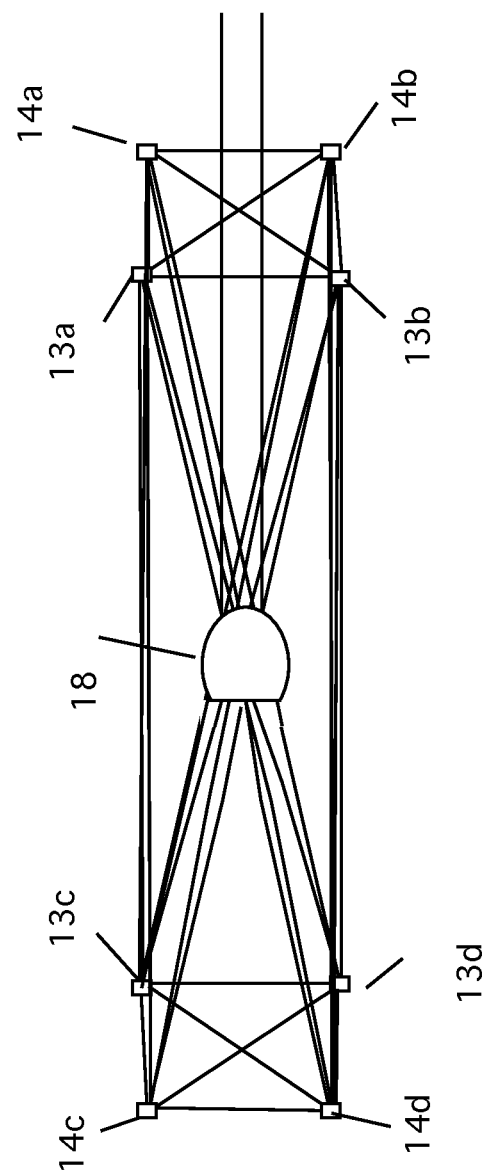
FIG. 6*a* is a diagrammatic view showing the second position distances calculated as used in a second embodiment.

FIG. 6a is a diagrammatic view showing the second position distances calculated as used in a second embodiment. As before, the distances are shown as lines running to the targets.

Figure 7:
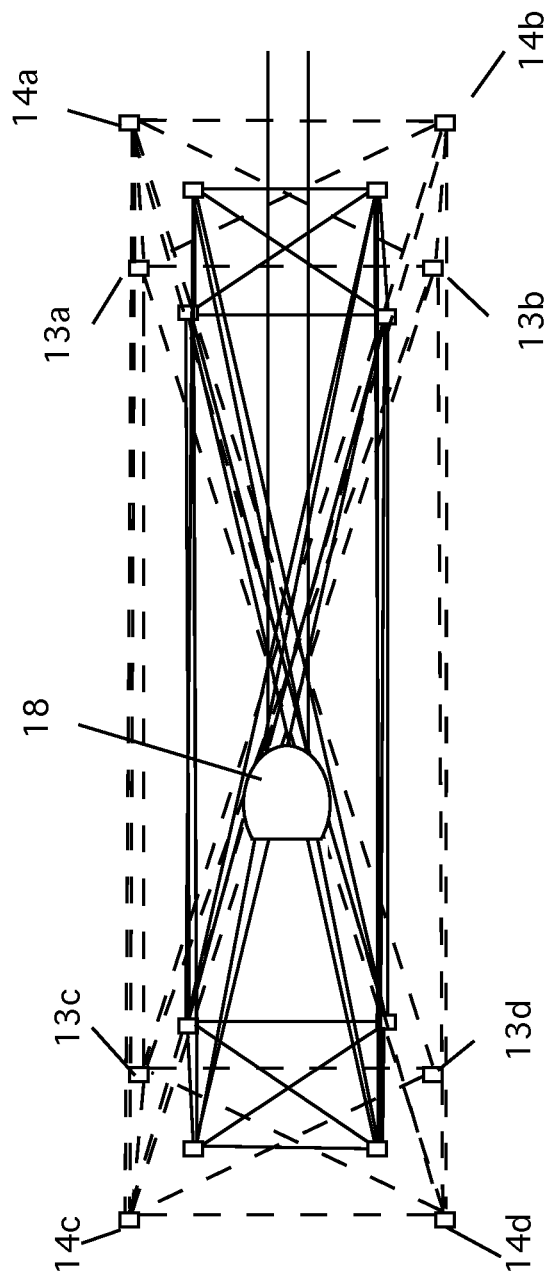
FIG. 7 is a diagrammatic view showing the laser scanner of the second embodiment, in the first position, overlaid with the laser in the second position, shown in dashed lines.

FIG. 7 is a diagrammatic view showing the laser scanner 18 in the first position, overlaid with the laser scanner 18 of the second embodiment, in the second position, shown in dashed lines.

Figure 8:
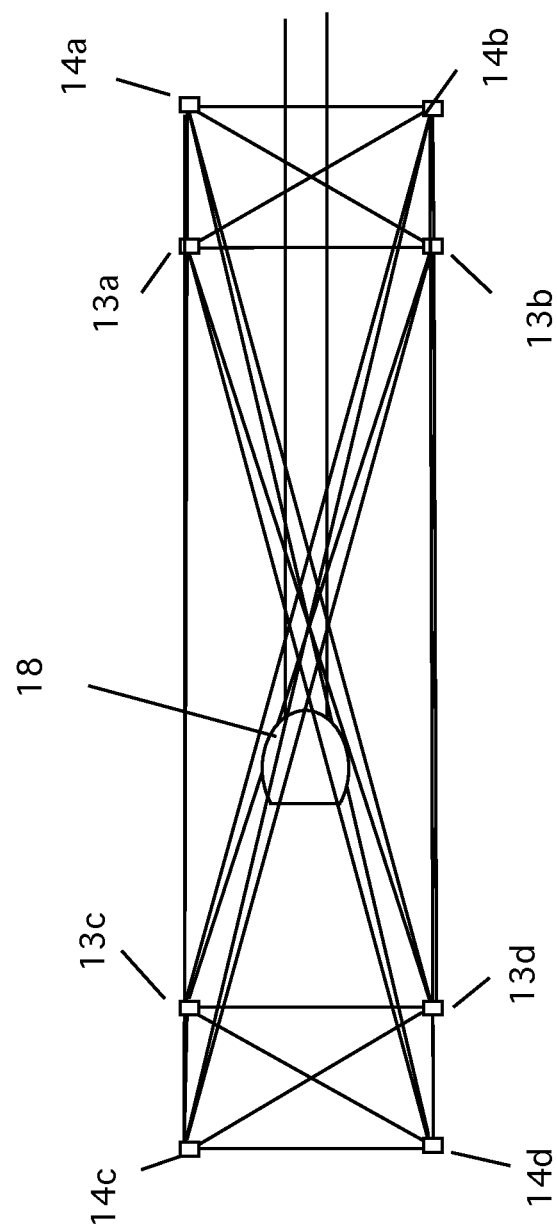
FIG. 8 is a diagrammatic view showing the results of best fit for the first and second positions as used in a second embodiment.

FIG. 8 is a diagrammatic view showing the results of best fit for the first and second positions as used in a second embodiment. These figures are produced by the least squares fit of the two readings.

Description of the Software

A software system has been created that can be used with any of the above methods. The purpose of this software is to check the measuring consistency of the scanner and report this "Calibration Check". The software is loaded at the site of the laser measurement system using a computer disk. In the description below, the software is used with a first embodiment example of the method.

Figure 9:
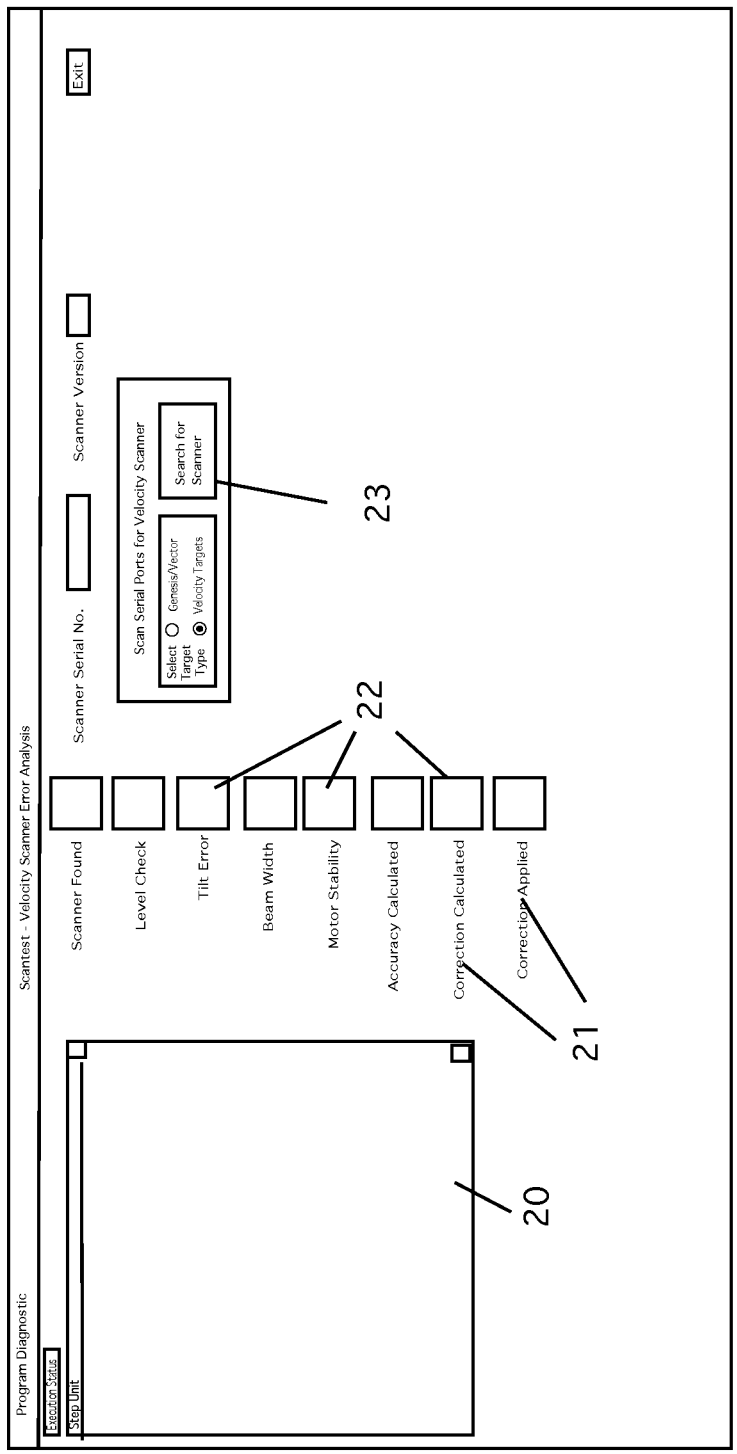
FIG. 9 is a representation of a computer screen showing the initiation of a calibration check for a scanner as used in the invention.
Figure 10:
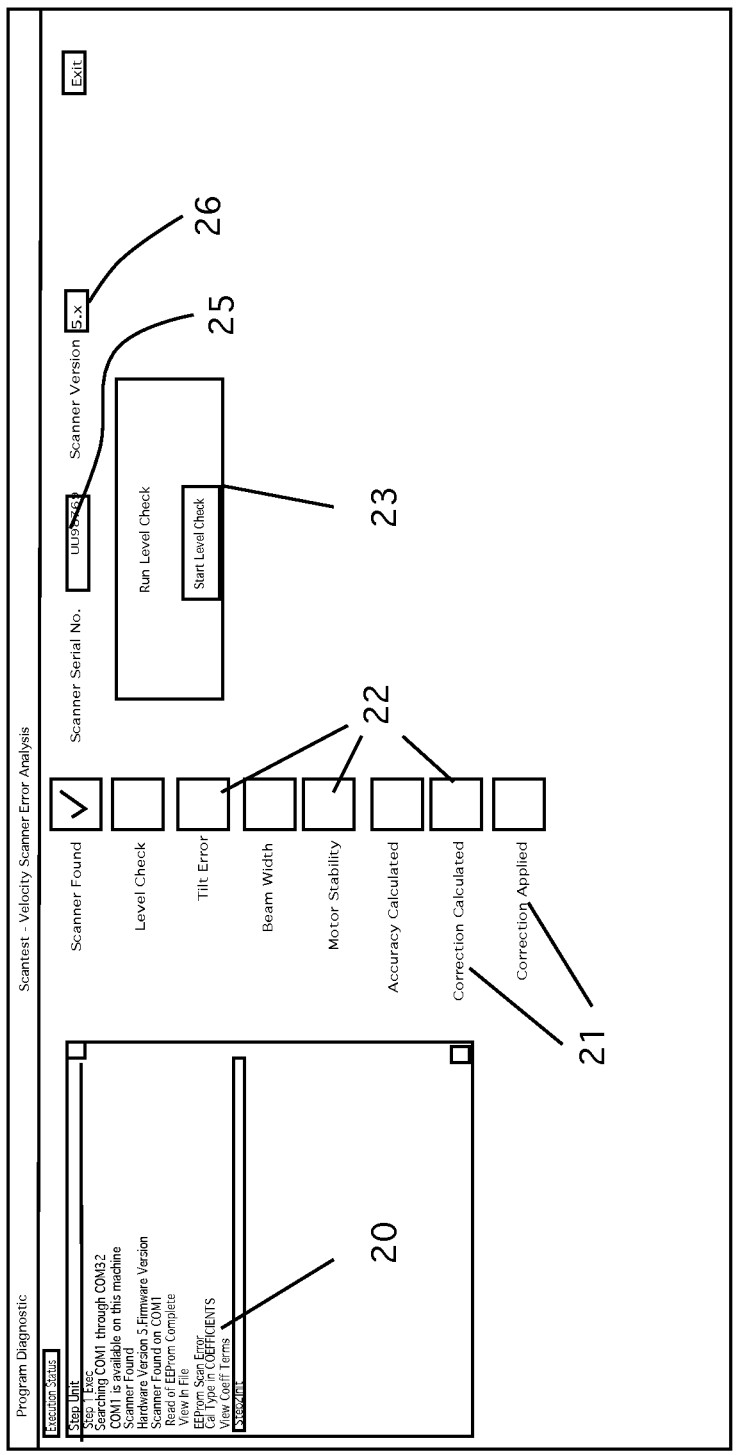
FIG. 10 is a representation of a computer screen showing a further step in the calibration check for a scanner as used in the invention.

FIG. 9 is a representation of a computer screen showing the initiation of a calibration check for a scanner. As shown on FIG. 10, the initial screen displays a listing of steps performed in the process in a box 20. To the right of that box is a list of steps 21 performed in the check and boxes 22 that indicate completed steps. A command box 23 is located near the center top of the screen. This box indicates the step to be performed and provides a clickable button to perform that step. FIG. 10 shows the step for locating a particular scanner. It also lets the user select the type of targets to use for the test. Once the "search for scanner" button is clicked, the software scans the communications ports so that the software can talk to the scanner. It requests the serial number for that scanner. Using this number, the software generates a unique number for that that laser measurement system.

That number is called in or emailed to the operator of the calibration system and (after payment is received) the operator of the laser measurement system is given the unlock code. This code limits the user to an individual system such that if the laser measurement system operator runs the check calibration, the user can only check the uniquely identified scanner and cannot put multiple scanners in to check calibration. The system can be set up so that a one year license, preferably adjustable by a number of months) that would be renewed with regular payments.

FIG. 10 is a representation of a computer screen showing the next step in the calibration check for a scanner. At this point, the computer has located and identified the scanner and has displayed the serial number 25 and software version 26. Note that box 20 lists a number of steps to find and identify the scanner. Note also that the first box 22 is checked, indicating that a scanner has been found. In the command box 23, the next command "run level check" is displayed. Clicking on the command button initiates the next step.

Figure 11:
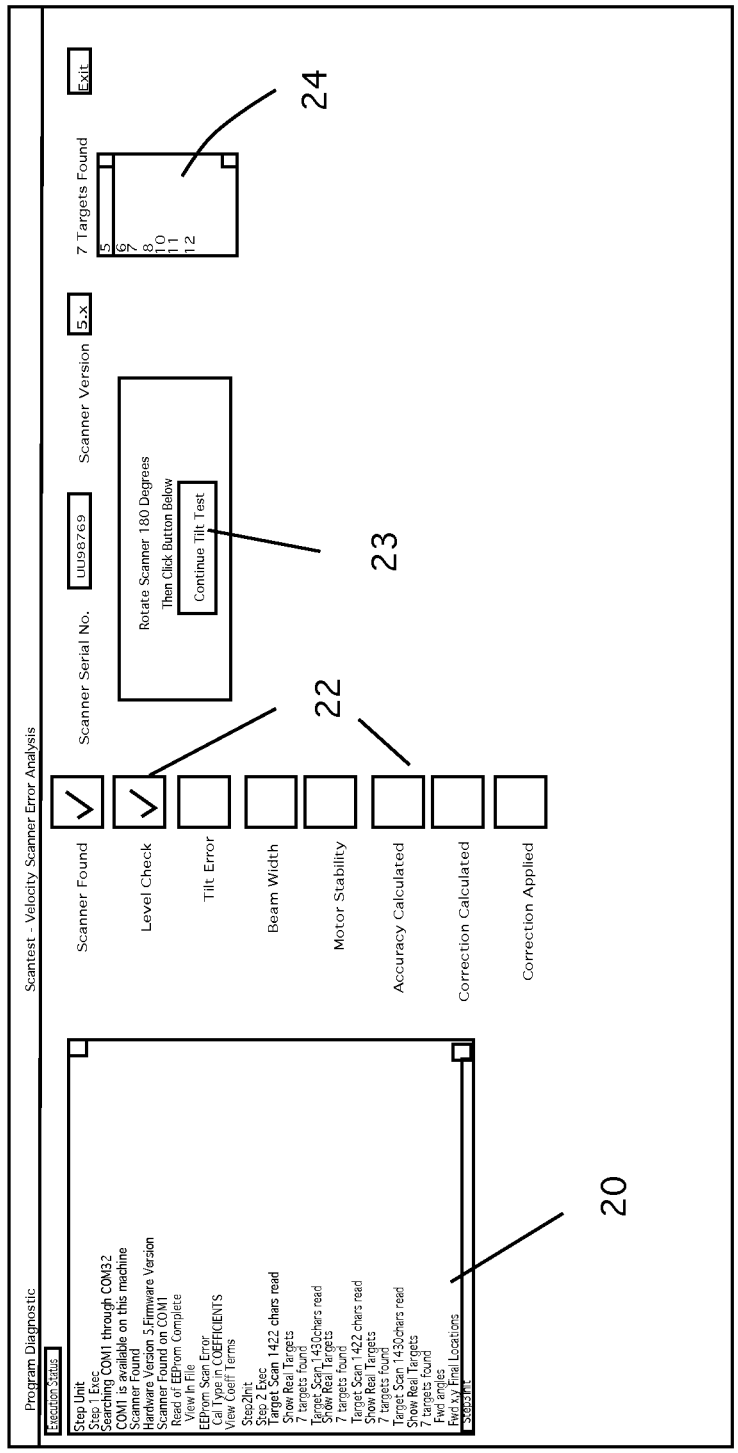
FIG. 11 is a representation of a computer screen showing the rotation phase in the calibration of a scanner as used in the invention.

FIG. 11 is a representation of a computer screen showing the rotation phase in the calibration of a scanner. At this point, the software has run a scan and has identified a number of targets. These are listed in box 24 at the right of the screen. The targets have been given an identifying number as shown. Note that the second box 22 has been checked indicating that the level check has been completed. The command box 23 now instructs the user to rotate the scanner 180 degrees. Once rotated, the user clicks on the "continue tilt test" button to complete the next step.

Figure 12:
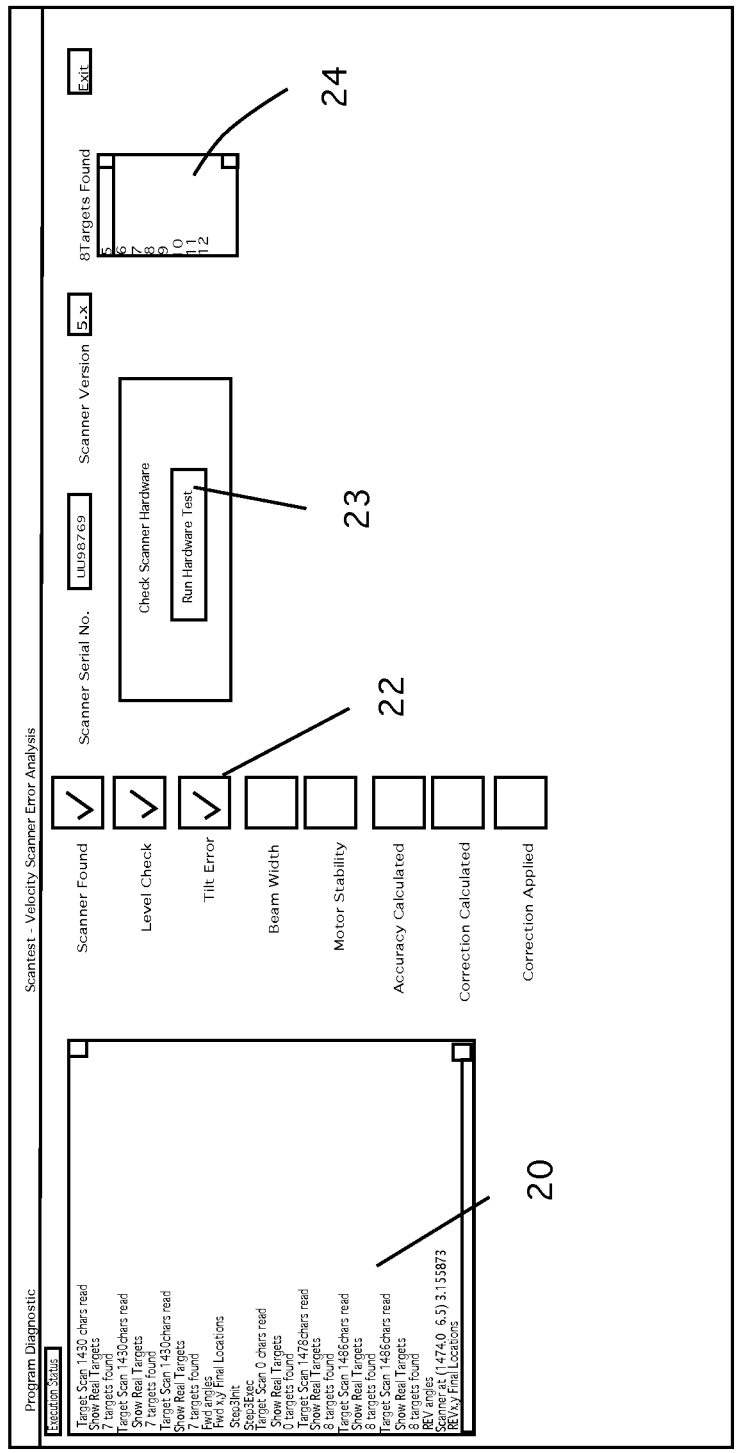
FIG. 12 is a representation of a computer screen showing the initiation of a hardware check for a scanner as used in the invention.

FIG. 12 is a representation of a computer screen showing the initiation of a hardware check for a scanner. In this figure, box 20 now shows a number of scans and readings have been made. Note that the target list box 24 has been updated. Now, three of the boxes 22 have been checked. The command box 23 is indicating the next step, which is a hardware test. Clicking on the button starts this test.

Figure 13:
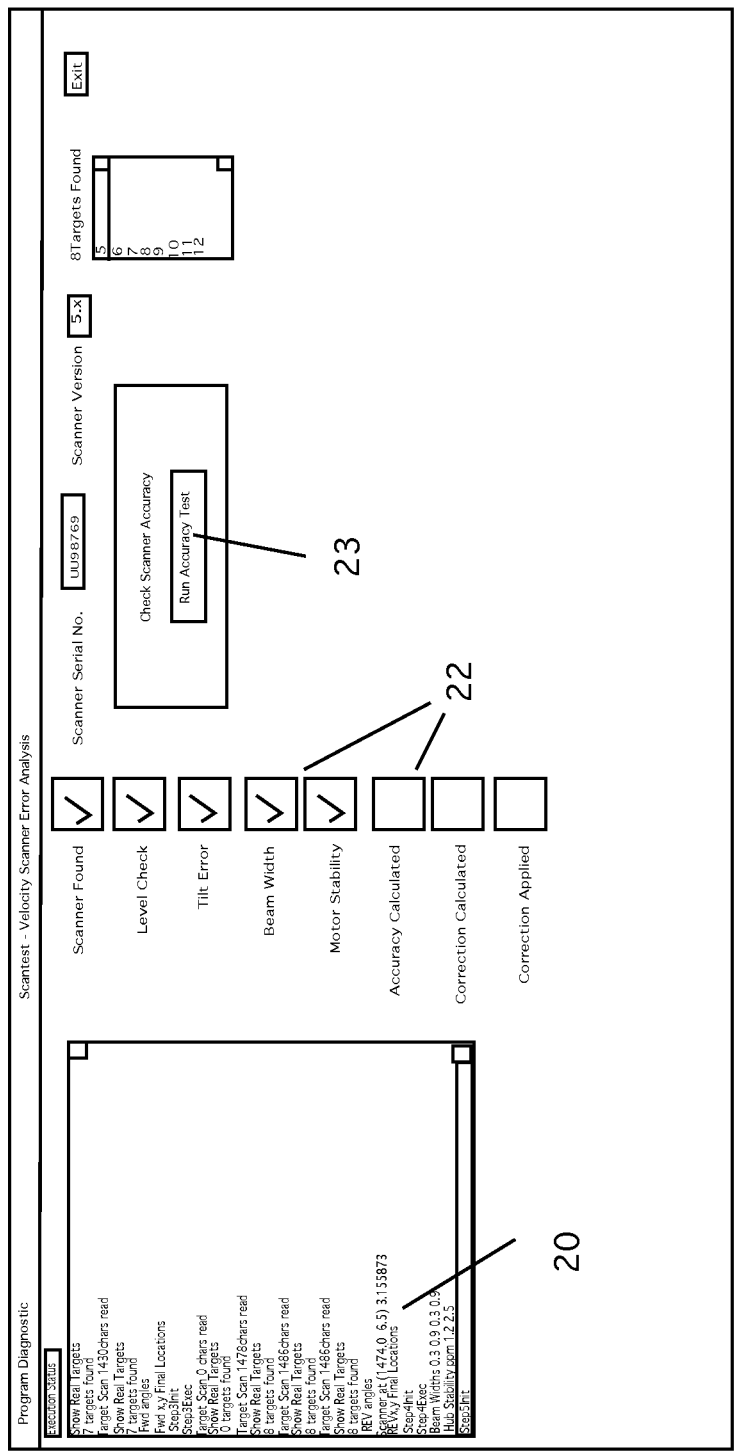
FIG. 13 is a representation of a computer screen showing the initiation of an accuracy check as part of a calibration check for a scanner as used in the invention.

FIG. 13 is a representation of a computer screen showing the initiation of an accuracy check as part of a calibration check for a scanner. At this point, both the beam width and motor stability have been checked an approved (see boxes 22). The next step is to check the scanner accuracy. Clicking on the button begins this test.

As previously discussed, using the software, the user has been directed to set up the scanner under a vehicle with targets (or other specified set of targets) set in unspecified positions. A reading has been taken. The user has been prompted to rotate the scanner 180 degrees and another reading has been taken. The difference between the two readings is analyzed and reported as an error in a range. For example 500 mm, 1000 mm, 1500 mm, 2000 mm, 3000 mm, 4000 mm with the error in mm listed in a table within the range. A vector error can be used or the X, Y-axis errors can be displayed. The Z-axis may only be reported as a difference from one side to the other. It is not intended at this time to make an absolute correction for the Z-axis. Additionally, it is possible for the invention to display the basic scanner diagnostics like mirror rotation speed, mirror rotation hub stability, and receiving synch pulses, if desired.

Figure 14:
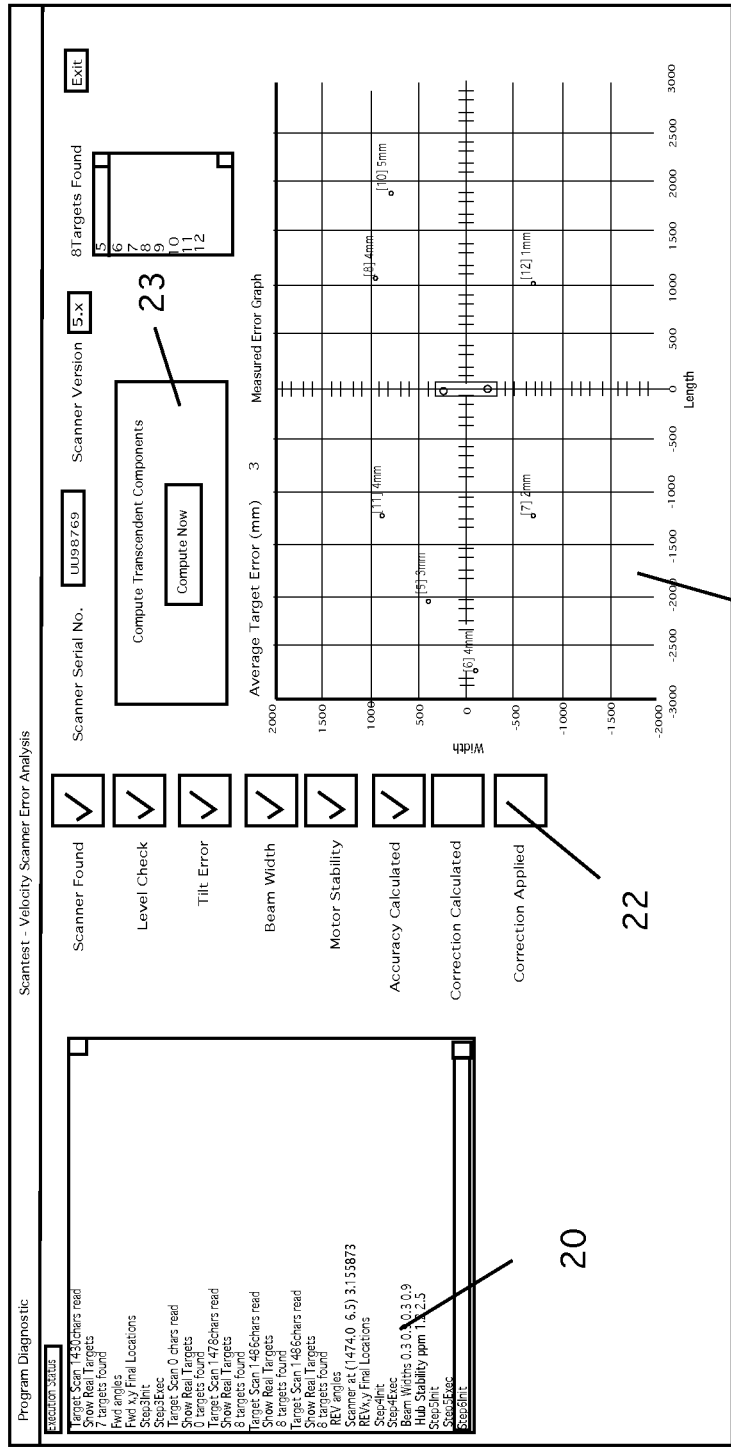
FIG. 14 is a representation of a computer screen showing results of an accuracy check as part of a calibration check for a scanner as used in the invention.

FIG. 14 is a representation of a computer screen showing results of an accuracy check as part of a calibration check for a scanner. Here, the accuracy calculated box is checked and the system has displayed a graph 27 of average target error. These are displayed by location on the graph and identified by target number and by the measurement error (in this case, labeled in mm). The command box 23 has a "compute now" button, which initiates the computer process to calculate the solution and determines if the errors can be compensated.

Figure 15:
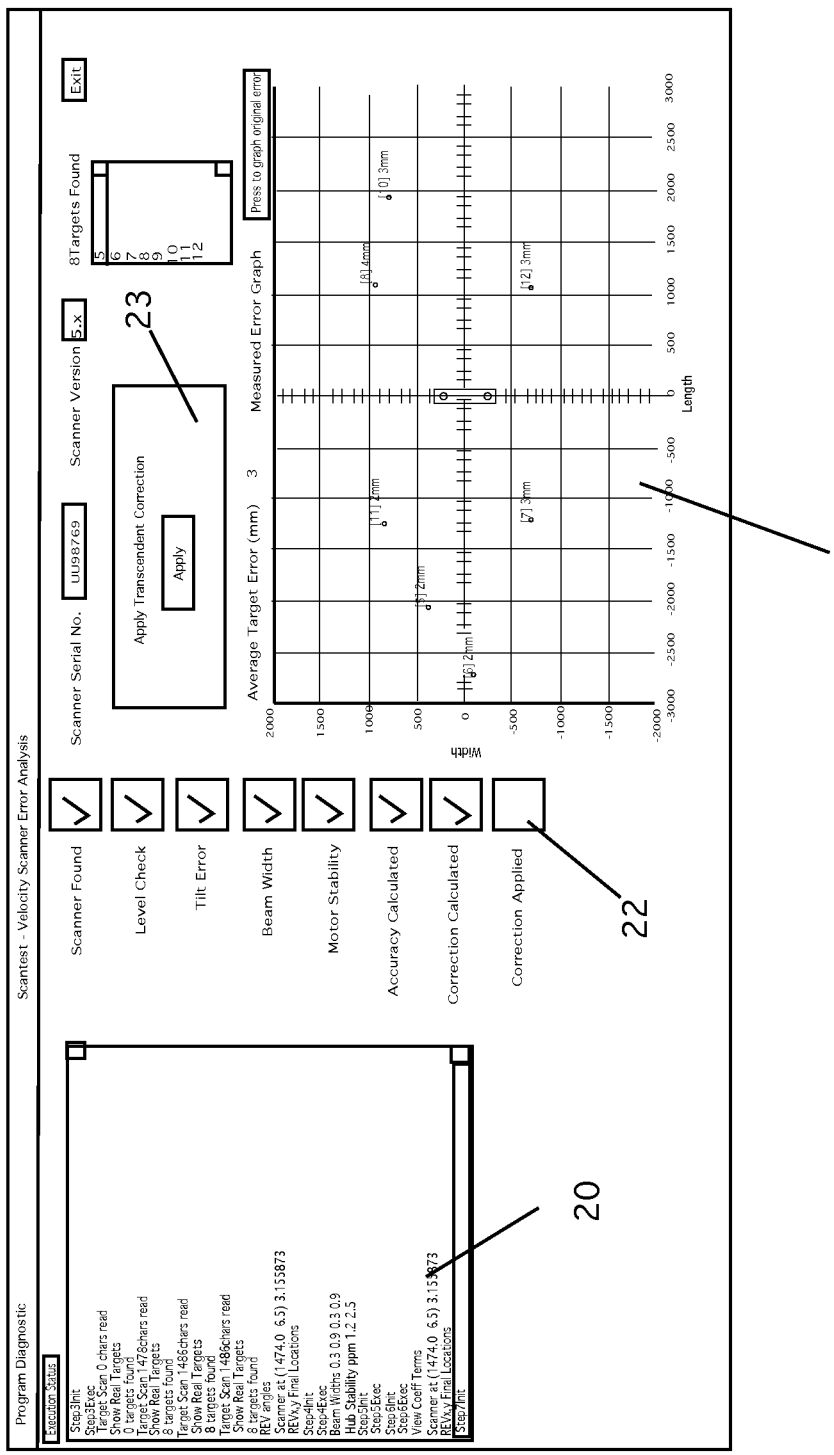
FIG. 15 is a representation of a computer screen showing the calibration correction ready to be applied to the scanner as used in the invention.

FIG. 15 is a representation of a computer screen showing the calibration correction ready to be applied to the scanner. The error is not compensated that this point, but as noted, the indicator is included in the report. If the laser measurement system operator elects to run the compensation (by clicking on the button in box 23), the system generates another unique number. This number includes the serial number of the scanner. In addition, the magnitude of the error is displayed.

Figure 16:
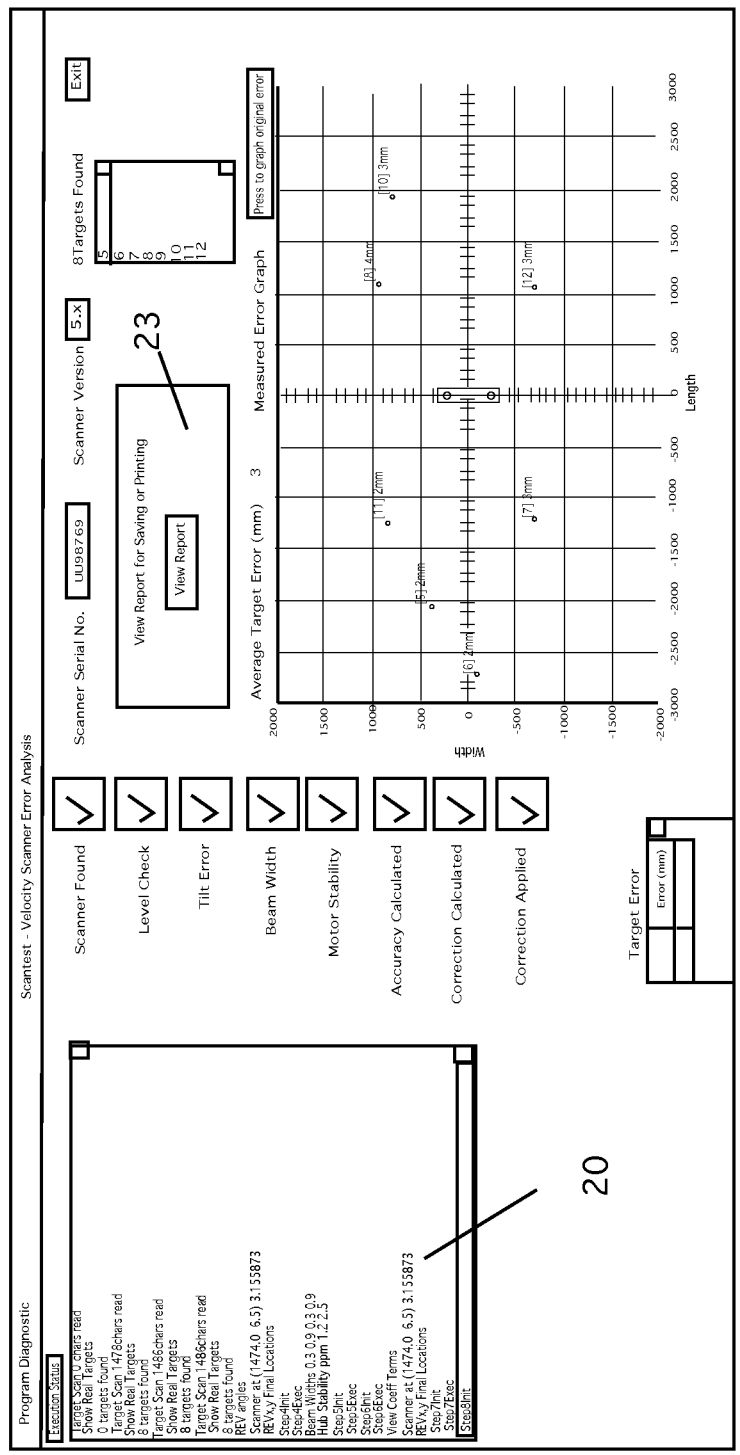
FIG. 16 is a representation of a computer screen showing the end of the calibration and the report phase as part of a calibration check for a scanner as used in the invention.

FIG. 16 is a representation of a computer screen showing the end of the calibration and the report phase as part of a calibration check for a scanner. The command in box 23 allows the user to print the report described above.

At that point, the operator of the laser measurement system calls into the home office for a key code that gives the user a single authorization to apply the compensation to the scanner and write it to the scanner. A report is then generated by the software for the shop, documenting the scanner performance.

In this way, an operator can quickly and easily ensure that the scanner is properly calibrated in situ, avoiding the problem of packing and shipping the scanner back to the factory for recalibration.

Finally, as noted above, although the method above used eight targets, a minimum of two targets in the field of view on either side of the scanner(s) can be used. The minimum number of targets can be set in the software to whatever number is desired.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. A method of calibrating a laser measurement system in-situ, wherein the laser measurement system includes a laser scanner having synch pulses and a base line within said laser scanner, comprising the steps of:
    a) placing a scanner in a location having at least two random targets;
    b) using the scanner to scan the at least two random targets to create a first set of data;
    c) storing said first set of data;
    d) repositioning the scanner;
    e) using the scanner to scan each of said at least two random targets to create a second set of data;
    f) comparing said first and second sets of data to determine a true position of each of said at least two random targets and to create a correction factor for said scanner such that the synch pulses are coordinated and the base line of the scanner is a true base;
    wherein the step of comparing said first and second sets of data, further includes the steps of: g) interpolating said first and second sets of data; and
    h) correcting a synch pulse generated by said scanner using the correction factor such that the synch pulses are coordinated and the base line of the scanner is a true base.

2. The method of claim 1 wherein the scanner is placed in a location such that one of said at least two random targets is placed on either side of the scanner.

3. The method of claim 1 wherein a minimum of 4 targets is used.

4. The method of claim 1 wherein one of said at least two random targets is considered to be a near field target and the other of said at least two random targets is considered to be a far field target.

5. The method of claim 1 further comprising the step of: after step f, repeating steps a-f to further reduce the scanner error.

6. The method of claim 1 wherein the step of comparing said first and second sets of data is performed by a computer.

7. The method of claim 1 wherein the scanner is selected from the group of polar coordinate based laser scanners or triangulation based laser scanners.

8. The method of claim 1 wherein the step of repositioning the scanner comprises rotating the scanner 180 degrees.

9. A method of recalibrating laser measurement systems in-situ comprising the steps of:
    a) setting a scanner in a location having a plurality of random targets;
    b) using the scanner to read and determine measurements to each of said a plurality of random targets to create a first set of data;
    c) storing said first set of data;
    d) rotating the scanner 180 degrees;
    e) using the scanner to read and determine measurements to each of said plurality of random targets to create a second set of data;
    f) comparing said first and second sates of data to determine a scanner error;
    g) using a computation method to determine a true position of each of said plurality of random targets and to create a correction factor for said scanner; and
    h) applying said correction factor to said scanner to correct said scanner error such that, after the correction factor has been applied, the synch pulses are coordinated and the base line of the scanner is a true base.

10. The method of claim 9 wherein the scanner is placed in a location such that a portion of said plurality of random targets is placed on either side of the scanner.

11. The method of claim 9 wherein a minimum of 6 targets is used.

12. The method of claim 9 wherein a portion of said plurality of random targets is considered to be near field targets and the remainder of said a plurality of random targets is considered to be far field targets.

13. The method of claim 9 wherein the step of using a computation method includes using a least squares fit method and further includes the step of interpolating and correcting a synch pulse generated by said scanner.

14. The method of claim 9 further comprising the step of: after step h, repeating steps a-g to further reduce the scanner error.

15. The method of claim 9 wherein the step of using a least squares calculation is performed by a computer.

16. The method of claim 9 wherein the scanner is selected from the group of polar coordinate based laser scanners and triangulation based laser scanners.

17. A method of recalibrating a laser measurement scanner having synch pulses and a base line in-situ using a computer having a monitor screen comprising the steps of:
    a) setting a scanner in a location having a plurality of random targets;
    b) loading a correction software program on said computer from a calibration software provider;
    c) examining the laser measurement system to find a product serial number;
    d) running a level check to determine a first set of location readings for each of said plurality of random targets;

e) instructing an operator to rotate the scanner 180 degrees;

f) running a level check to determine a second set of location readings for each of said plurality of random targets;

g) comparing said first and second sets of location readings and generating an error graph on said computer monitor screen;

h) computing a correction factor of the differences between said first and second sets of location readings; and i) applying said correction factor, generated by said computing, to said scanner such that the synch pulses are coordinated and the base line of the scanner is a true base.

18. The method of claim 17 wherein serial number of the scanner is used to generate a unique number for that combination to identify the laser measurement system.

19. The method of claim 18 further comprising the steps of:

a) communicating said unique number to said calibration software provider; and b) receiving an unlock code from said calibration software provider.

20. The method of claim 17 further comprising the step of: after step f, performing a hardware test for said scanner.

21. The method of claim 20 wherein the step of performing a hardware test for said scanner includes testing a beam width and a motor stability of said scanner.

22. The method of claim 17 wherein a listing of identified targets is displayed on said computer monitor screen.

23. The method of claim 17 wherein the errors graph displays the errors in a range.

24. The method of claim 17 further comprising the step of:

a) after step h and before step I, contacting the calibration software provider to obtain a key code that provides a single authorization to apply the correction to the scanner.

25. The method of claim 17 further comprising the step of generating a report detailing the calibration process.

\* \* \* \* \*